United States Patent [19]

Trapp

[11] Patent Number: 4,744,931
[45] Date of Patent: May 17, 1988

[54] PRESSURE-DETERMINED SHAPING SYSTEM FOR EACH OF MULTIPLE, COMMONLY MANIFOLDED CURING PRESSES

[75] Inventor: Dennis L. Trapp, Akron, Ohio

[73] Assignee: The Uniroyal Goodrich Tire Company, Akron, Ohio

[21] Appl. No.: 898,965

[22] Filed: Aug. 21, 1986

[51] Int. Cl.$^4$ ................ B29C 35/04; B29C 37/00
[52] U.S. Cl. ................ 264/40.5; 264/40.6; 425/29; 425/149; 425/151; 425/170
[58] Field of Search ............ 264/40.1, 40.5, 40.6, 264/315, 326; 425/29, 36, 52, 149, 150, 151, 163, 170

[56] References Cited

U.S. PATENT DOCUMENTS

| | | | |
|---|---|---|---|
| 4,022,555 | 5/1977 | Smith | 425/29 |
| 4,222,721 | 9/1980 | Gado | 264/315 |
| 4,422,987 | 12/1983 | Anmatsu | 264/40.3 |
| 4,542,466 | 9/1985 | Anmatsu | 264/40.6 |

*Primary Examiner*—Jan H. Silbaugh
*Assistant Examiner*—Neil Michael McCarthy
*Attorney, Agent, or Firm*—Alfred D. Lobo; Alan A. Csontos

[57] ABSTRACT

Pressure is controlled in plural stages of a shaping system for a green tire in a curing press, so that each successive shaping stage is completed when a target pressure for that stage is reached. A radial tire is preferably shaped in three stages in the first of which a first target pressure in the range from 2 psig to 5 psig is the desired shaping pressure; in the second stage, a second target pressure in the range from 7–10 psig is desired; in the third stage, a third target pressure in the range from 10–15 psig is desired. A pressure transducer (PT) senses the pressure in a bladder, one PT for each bladder. A programmable controller (PC) which controls operation of the press, stores and executes a sequence of instructions which determine the optimum desired shaping pressure for each stage, computed from the type and size of the tire to be cured, the period of time the press is down before it is loaded, and the number of heats on each bladder. The automatic computation of optimum desired pressure for each shaping stage avoids having an operator set a mean pressure for each stage by trial and error, making such adjustments for change of bladder, and unduly long press down time which in his judgment appear to be reasonably likely to produce a defect-free cured tire.

6 Claims, 4 Drawing Sheets

PRESSURE-DETERMINED SHAPING SYSTEM FOR EACH OF MULTIPLE, COMMONLY MANIFOLDED CURING PRESSES

BACKGROUND OF THE INVENTION

This invention relates to the few seconds during which an inflatable elastomeric bladder is "shaped" before, during and after it is inserted into a tire in a curing press. More particularly this invention relates to a shaping system in which plural stages are required, and the desired optimum pressure to which the bladder is to be inflated may vary from one cured tire to the next. This optimum pressure is determined by calculation based on several variables, and when reached, is sensed by a pressure transducer (PT) means, so that, for the first time in the art of curing tires with a bladder, production of cured tires free of a "shaping defect", is a reality.

By "shaping" I refer to the initial inflation of the bladder to permit it to press against the inner surfaces of the tire uniformly and thus displace air between the bladder and the tire. It is critical that essentially no air be trapped between the bladder and the tire. Shaping may be done in several stages at pressures ranging from about 2 psig (lb/in$^2$ gauge) to about 25 psig depending upon the size of the green carcass, and whether it is for a bias or radial tire. For example, for a radial tire, the pressures may be sequentially increased from 2 psig to 5 psig, then to about 15 psig, and held for a different interval of time at each pressure level. The internal pressure during the curing step may likewise be "stepped" and held at each pressure level for a different interval of time which will be a function of the rate at which the desired optimum pressure is reached.

Only those persons actively involved with the curing (vulcanizing) of tires appreciate how easy it is for a scrap tire to be generated, and how high a percentage of such scrap is generated by a shaping defect. Shaping defects are so termed because they are directly attributable to a problem in the sequence of steps, typically during loading, or the first, second and third stages of shaping pressure during shaping.

Shaping defects include "trapped air" between the bladder and the tire, most likely resulting from undershaping. This typically occurs with a start-up of a 'cold' press, or when the bladder has just been changed and, being new and stiff, does not inflate as quickly or as well as it will after it is broken in with a dozen or more 'heats' (curing cycles).

A "rolled bladder" defect is attributed to the bladder rolling up against the loader paddles during ring drop. This is caused by too high a pressure in the first shaping stage, or using a bladder which is the flaccid survivor of too many heats.

If the shaping pressure in the first stage is either too high or too low, the tire is found to be "cocked in the mold", or incorrect pressure could result in buckling ("buckles") of portions of the bladder which results in defects in the tire. If in addition, the shaping pressure in the third stage is too low, "sidewall lightness" is the result, or if too high, a tire with "tread folds", which indicate "overshaping", is the result.

The simple fact is that any one of the foregoing defects results in a rejected tire and a correspondingly higher cost of producing acceptable tires. Over the years, the effort to minimize shaping defects and enhancing quality, has been unremitting. This effort has included using a wide array of compounds for the specific purpose of producing more reliable bladders; and a number of shaping systems relying on mechanical improvements in the valving, and switching from one type of piping layout to another more symmetrical one, using a carefully regulated low pressure steam supply, and the like. Details about such systems are seldom referred to in the published literature because they are zealously guarded as invaluable know-how.

A typical cycle for a passenger tire is about 15 min. and the sum of the time required for each of the plural shaping stages is generally less than 45 secs. The remaining portion of the cycle consists of the curing portion and the blowdown portion.

The blowdown portion of the cycle is the time it takes to purge steam from the bladder in each mold cavity until the pressure is sufficiently low to open the mold. Depending on numerous factors which are detailed in my copending U.S. patent application Ser. No. 888,896 filed July 24, 1986, this period was fixed in the prior art by a timer for each press and is about 30 sec for a passenger tire. If, for some reason, the pressure in the bladder is not low enough, the press will not open because of a pressure safety switch which mechanically responds to pressure on a diaphragm. The safety switch is set for a pressure low enough so as not to injure an operator who happens to be close by when the press opens. Such pressure is in the range from about 3 psig to about 10 psig.

Each press is already equipped with a mechanical pressure safety switch means, typically a diaphragm type in pressure sensing relationship with the interior of the bladder, which switch is preset for a preselected pressure at which the press may be safely opened. A similar mechanical pressure switch may be used to trigger the ring drop (for radial tires) when the pressure reaches a predetermined level, say 2 psig. Still another mechanical pressure switch, also of the diaphragm type, is used to warm up and pulse a newly installed bladder, or start up a cold press. With these mechanical pressure sensors and their inherent advantage in coping with a power failure, there is no reason to use an electronic pressure sensor. Moreover, since the blowdown sequence and all other curing operations in conventional presses are timer controlled, there is no reason to desire the installation of yet another pressure sensor, whether mechanical or not. Most of all, trying to monitor pressure sensitively enough to control the extent to which a bladder is inflated with a critically sensitive optimum desired pressure, seemed unlikely to become the basis of a successful shaping system.

The curing room typically houses from 50 to about 250 curing presses which are fed by central steam and water systems through steam and water manifolds to which each press is connected with appropriate valving. Of particular concern to this invention is the shaping steam manifold to which each press is connected. This manifold is typically a relatively large diameter steam line, in the range from 2" to 4" diam. depending upon the number of presses commonly manifolded.

Each press may include a single, but usually two, simultaneously operated molds and the press is preferably individually controlled by its own programmable controller ("PC") and the necessary instrumentation and hardware which allows a press to be operated automatically. The shaping instructions, specifically, for the PC, and the curing instructions generally, may be downloaded from a central computer each time the curing cycle is to be changed.

A curing press may be of the 'pot-heater' type referred to in U.S. Pat. No. 4,371,483, in which a stack of split-molds loaded with green tires is formed within a pressure vessel closed at the top, with a dome having a butt-plate against which the stack is biased by a hydraulic platform on which the stack rests. Conventional potheaters are of the type manufactured by United McGill of Columbus, Ohio or Pennsylvania Engineering Corp. of Newcastle, Pa., inter alia.

Another curing press is made by McNeil Corp. under the Bag-O-Matic trademark. This press uses a bladder which is raised and lowered on a central shaft axially disposed within a green tire in a mold cavity. Still another popular press is made by NRM Corp. under the Autoform trademark. This latter press is also referred to as the "bag-well" press because it uses a bag (bladder) in a central well, and a ram pushes the bag down before a cured tire is removed.

Regardless of the type of curing presses used in the curing room, each is manifolded to a common shaping steam manifold; though each press in a present-day curing room is controlled by a PC, in the prior art, the shaping pressures to which the bladder is inflated for each stage is fixed; that is, control valves, or pressure controllers (like those made by Sinclair Collins) set predetermined fixed pressures, and establish when each shaping stage is completed. The specific pressures are fixed from experience, and by trial and error.

At one time a Mercoid was used only as a pressure check at the press pause height. Later the Mercoid was used to control over the entire closing sequence instead of just at the press pause height. In addition, the Mercoid range settings were used to pulsate shaping from a low pressure setting to a high pressure setting, oscillating therebetween, through the entire shaping sequence.

More recent shaping systems use plural separate pressure controllers like Jordan, Leslie, Fisher, Sinclair Collins, for each side of the press which allow multiple different pressure settings to be used at different points in the press closing cycle. These provide an advantage over a Mercoid which permitted only one pressure setting. The point at which each shaping stage is initiated is determined by a cam setting on a cam train because a pressure controller does not know the position of the press which may be anywhere between being open and closed. The cam train is a device which mechanically senses the position of the press during the closing sequence. By the positioning of an individual cam, it can electronically transfer control from one shaping stage to another.

After a bladder has been in service for some time, or, when a press is being started up, or, when a ruptured old bladder is replaced with a new one, the pressures are re-set, that is, manually readjusted, again by trial and error.

In the curing of bias tires in some early attempts, it was concluded that the precise pressure for each stage need not be set if the precise location (within the mold) of the inner circumferential edge of the bladder, was sensed with a sensitive mechanical "finger" or a photocell (photoeye). Except that such mechanical sensing means is inapplicable to radial tires.

SUMMARY OF THE INVENTION

It has been discovered that a first signal generated by a pressure transducer ("PT") in pressure communication with the bladder of a curing press, but distally located relative to the press, may be compared to a second signal stored in a programmable controller ("PC") which controls operation of the press, and is used to provide a variable optimum desired shaping pressure at which the first of plural shaping stages is completed; the second signal corresponds to a preset target pressure computed with an algorithm utilizing data relating to (i) the "press down time", that is the period of time the press remains open before it is loaded, and (ii) the number of heats on the bladder for the particular type and size of tire to be cured. Increasing "down time" requires a corresponding increase in pressure. A stiff new bladder requires a higher presure than one which has many heats on it; for aged bladders, the pressure is reduced depending upon the number of heats on it. Additional signals corresponding to each of sequential additional shaping stages are analogously compared with signals generated by the PT, thus controlling the shaping pressure at each stage.

Accordingly it is a general object of this invention to provide a curing press with a PC which determines and, in combination with a PT, controls each pressure at which each of plural shaping stages is completed, and these pressures can be different for each curing cycle.

It is a specific object of this invention to provide an electronic pressure sensing means in combination with a PC to control the shaping sequence for curing a tire in a curing press. Reliance on a PT obviates the drawbacks of a mechanical pressure setting and pressure designed to provide the set pressure which cannot be changed automatically for differing curing conditions.

BRIEF DESCRIPTION OF THE DRAWINGS

The foregoing and other objects and advantages of my invention will appear more fully from the following description, made in connection with the accompanying drawings of preferred embodiments of the invention, wherein like reference characters refer to the same or similar parts throughout the views and in which.

DETAILED DESCRIPTION OF PREFERRED EMBODIMENTS

This invention is particularly adapted for use in a curing room in which plural curing presses are sequentially automatically loaded with green tires which are placed in each mold cavity by a loader, then cured in a predetermined sequence of operations controlled by a PC. A radial passenger car tire is cured in the most preferred embodiment of the invention, and in the following description, the tire is cured in a Bag-O-Matic press.

Operation of the shaping cycle is commenced when the tire loader carries the radial passenger green tire into the press and holds it in a centered position over the bladder assembly with the bottom bead just above the bead ring in the lower mold half. The first shaping steam pressure enters the bladder immediately after loading the press with the green tire. Typically the first stage target pressure is in the range from 3-5 psig, say 4 psig. A pressure switch, set for about 2 psig, is also activated with the start of the shaping steam. The purpose of the pressure switch is to ensure that about the correct inflation of the bladder is attained before ring drop so as to prevent damage to the bladder as the top ring moves down into the green tire. At completion of the top ring down cycle the loader paddles are collapsed and the loader is exited from the press.

A second shaping pressure which is higher than the first, is activated as the press starts to close. A third shaping pressure is activated just before the upper mold ring contacts the upper bead of the green tire at about 10-14 ins from press close (the closed position of the press). Typically the target pressure for the second shaping pressure is set in a range of from about 7-10 psig, say 8 psig, and the target pressure for the third shaping pressure is set in a range from 10-15 psig. The precise shaping pressure for each stage will depend upon the tire and bladder combination. The shaping steam pressure is on sweep shaping until the pressure is approximately 4 psig at which time the sweep valve is closed (blocked-off). The sweep shape ensures removal of condensate.

In particular, the following detailed description refers to the details of three-stage shaping system which precedes the curing of a tire in a three stage curing process more fully described in U.S. Pat. No. 4,490,325. The details of the curing stages are incorporated by reference thereto as if fully set forth herein, but are unimportant for the purpose of understanding the significance of precise shaping as taught in the invention claimed herein.

Figure 1:
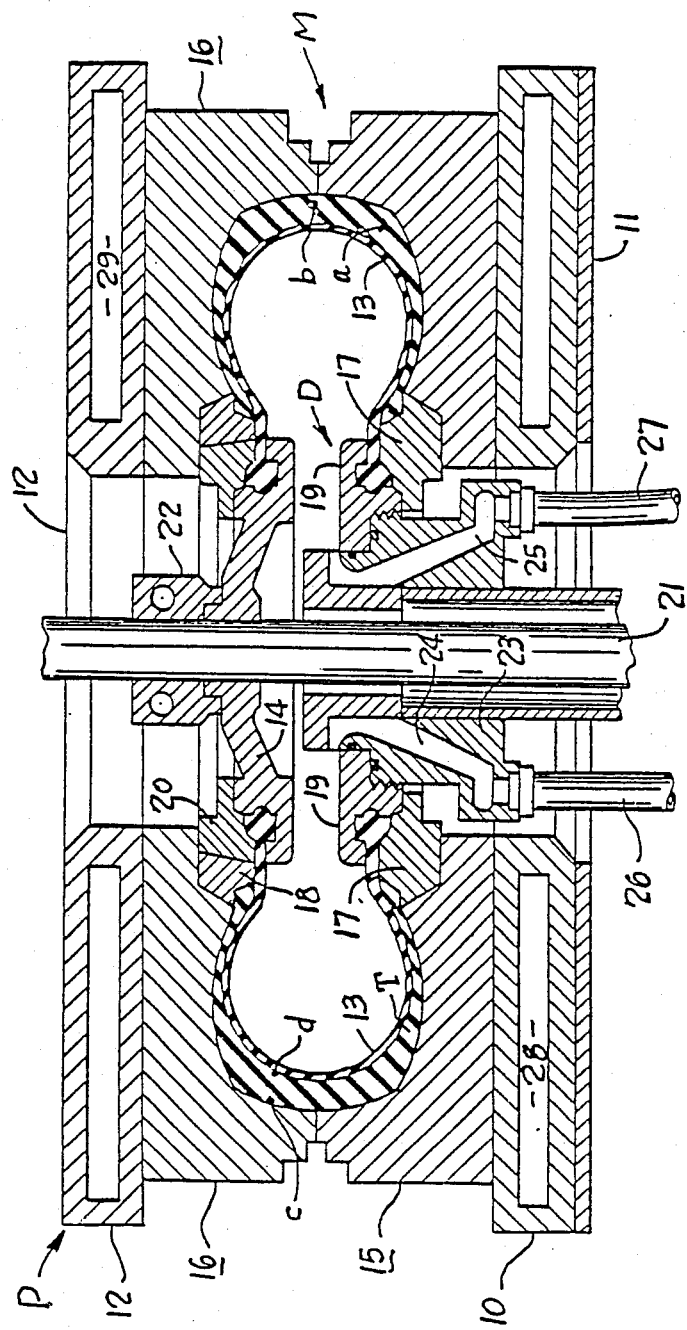
FIG. 1 is a partial vertical cross-sectional view on a reduced scale, showing the conventional type of equipment including a shaping and vulcanizing press (curing press) and a tire mold.

Referring to FIG. 1 there is shown a platen press P and a tire mold M in which a tire T is being cured with an elastomeric curing bladder or diaphragm 13 inflated to exert pressure against the inner surfaces of the tire. The drawing is schematic with parts omitted, and the mold and the press are not drawn to scale. The platen press P may be a standard type of "Bag-O-Matic" press substantially as shown and described, for example, in U.S. Pat. No. 2,808,618 and other patents of L. E. Soderquist.

As shown herein press P includes a fixed platen 10, a bed 11 and a platen 12 rigidly mounted on the movable upper portion of the press (not shown). As indicated in the last-named patent, conventional means are provided for raising, lowering and tilting the entire upper assembly. A conventional bladder mechanism D is provided at the center of the press with the bladder 13 as indicated in the aforesaid patent and in U.S. Pat. No. 2,775,789.

The lower and upper halves 15 and 16 of the tire mold M are rigidly connected to the platens 10 and 12. A multiplicity of vent passages (not shown) extend from the toroidal mold cavity to the exterior of the mold. The bladder mechanism D has lower and upper bead positioning rings 17 and 18 and a lower diaphragm clamping ring 19. Upper diaphragm clamping rings 14 and 20 fit within the bead ring 18. Clamping rings 14 and 20 are moved vertically by a piston rod 21 having an attaching collar 22. An annular support member 23 has a pair of passages 24 and 25 in communication with inlet and outlet conduits 26 and 27 to permit free flow of water and steam to and from the bladder 13. Each of said passages may have a cross section elongated in the circumferential direction.

The press P is heated by supplying steam to the annular chambers 28 and 29 of the lower and upper platens, and, if desired, the heating may be continuous to maintain a substantially constant temperature.

Figure 2:
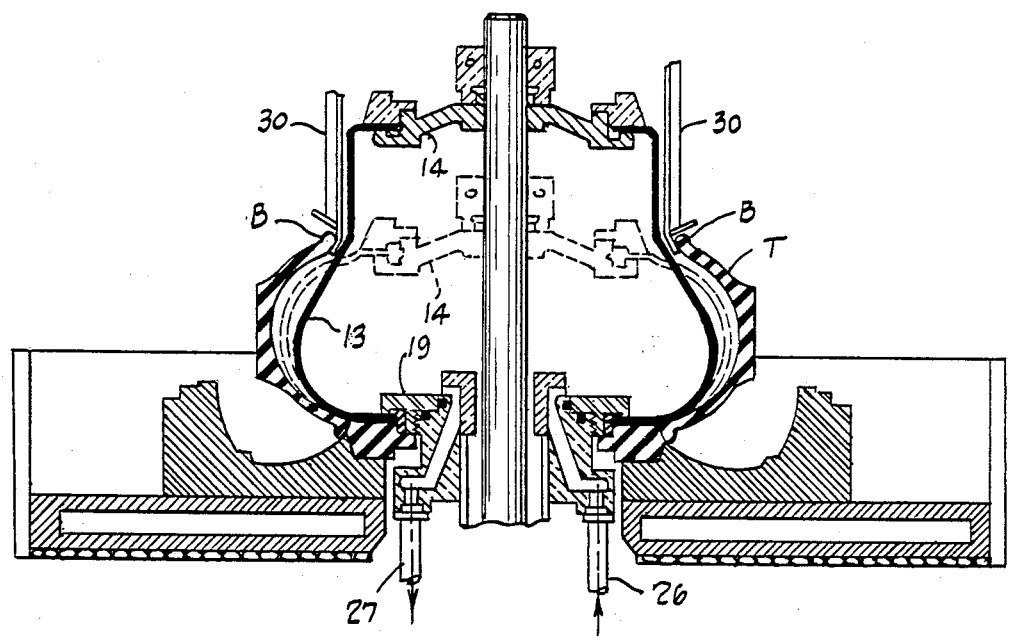
FIG. 2 is a partial vertical cross-sectional view on a reduced scale, showing the position of a Bag-O-Matic type of bladder while it is being inflated in an initial shaping stage, and then, in phantom outline, in an intermediate shaping stage.

Referring to FIG. 2, there is shown a green carcass T held by its upper bead B by the ends of paddles 30 of a loader (not shown). The initial stage of shaping of the bladder 13 is illustrated, just before ring drop which positions the bladder (shown in phantom outline) within the tire. When the bladder pressure reaches 2 psig, the upper ring 14 drops into its position shown in phantom outline. It is essential that the bladder be precisely positioned at this stage or the cured tire will be defective.

After the inflated bladder is properly positioned in the green tire and has reached its first target pressure (stage one shaping pressure) the loader paddles collapse and the loader exits the press. In the meanwhile the pressure in the bladder increases until it reaches the 4 psig target pressure set for the first shaping stage, and this pressure is maintained until the loader exits. When the loader has exited the press, it trips a limit switch which actuates press closing. Soon thereafter, as determined by the cam train, the second stage is initiated, typically reaching a second target pressure of 8 psig (say). Thereafter the third target pressure is reached and shaping is complete.

Figure 3:
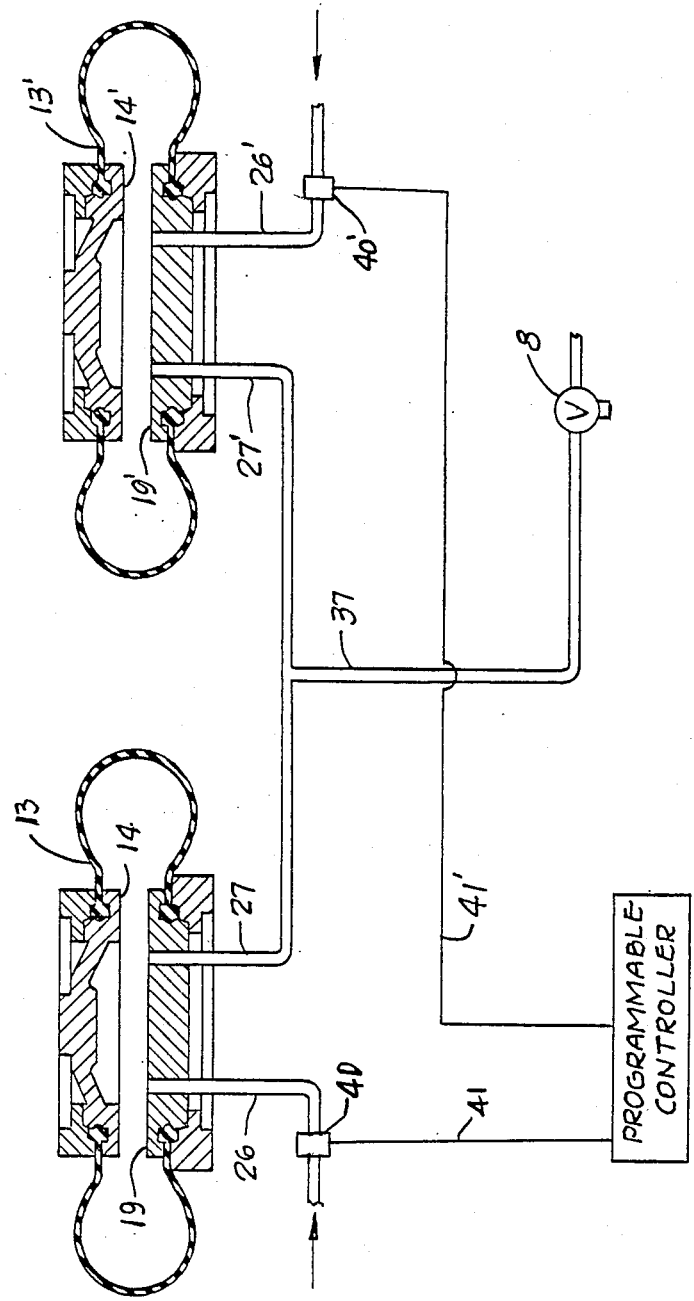
FIG. 3 is a schematic illustration of a pair of bladders in a dual-cavity curing press in which the bladders are connected to fluid service lines, and showing the PT located on the supply side of the shaping steam lines.

Referring now to FIG. 3, there is shown a typical two-cavity press in which two assemblies described hereinabove are installed to cure two tires at a time. The second mold M' in the two-cavity press has an analogous bladder 13' deployed within a tire T' placed in the upper mold half 15' around the center bladder mechanism D' and piston rod 21', and inlet and outlet ports connected to a platen-supply inlet and outlet lines, in a manner analogous to that described for the first mold. The sensing ends 40 and 40' of the tubing for the PT is inserted in the supply side of the service supply lines 26 and 26' of the press.

Figure 4:
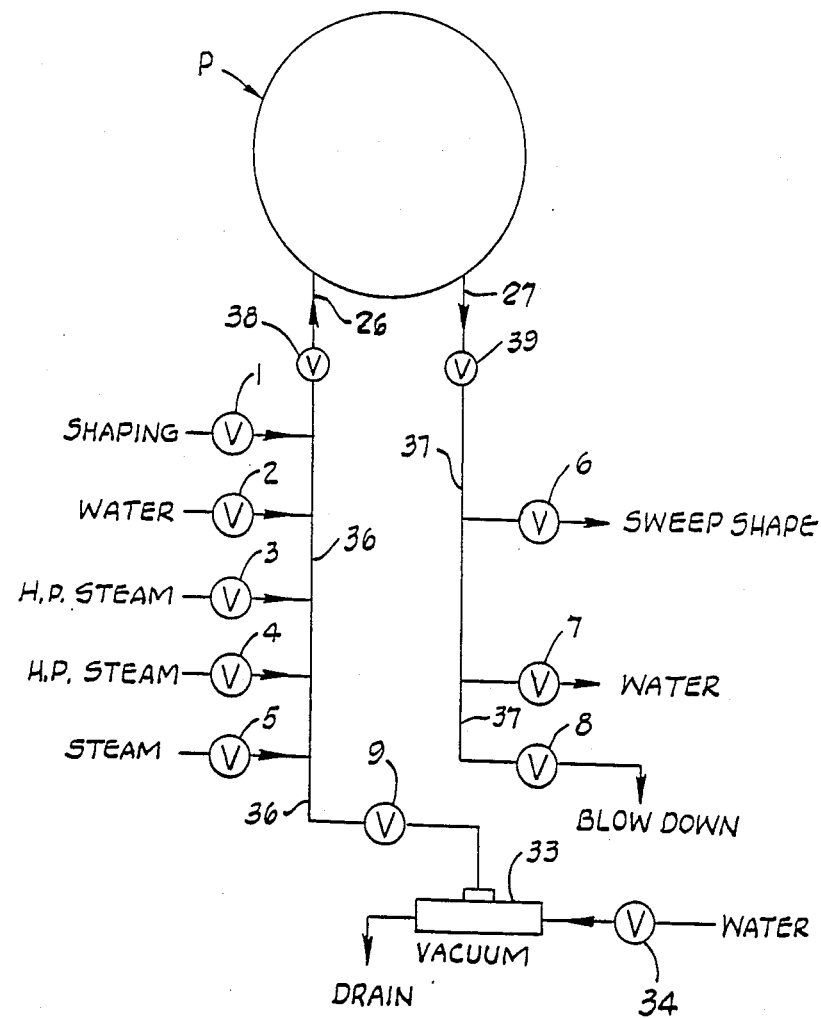
FIG. 4 is a diagrammatic plan view showing the valves and piping for controlling flow of water and steam to and from the curing bladder of a typical press.

FIG. 4 indicates diagrammatically, and in greater detail than FIG. 3, the type of piping arrangement which may be employed with each press used in the practice of this invention. Since the pressure within each of the bladders in the press is sensed separately, the pressure set for each shaping stage stage of each bladder may be different, particularly if the number of heats on one bladder is high, while the other bladder is new. The curing pressures used after shaping is completed will be the same in each bladder, and are predetermined and fixed.

With a multiplicity of presses in a curing room, a more sophisticated valving and piping system is used. Typically, plural inlet manifolds are provided which selectively supply both hot water and/or steam at predetermined pressures and temperatures in a predetermined sequence of operations, each with a specific, fixed period of time for curing the tire under process conditions adequate for the purpose, after the tire is shaped, all of which post-shaping curing is conventional and of no particular concern in the shaping stages.

The press and related apparatus of FIG. 4 includes valves 2 through 9 and other valves for controlling flow of water and steam to and from the curing bladder of the press P through inlet and outlet conduits 36 and 37. Valves 38 and 39 in the latter conduits are normally open and can be closed to stop such flow when the press P is out of service.

The valve 1 controls the flow of shaping steam designated "shaping"; valve 2 controls the flow of high-pressure heated water designated "water"; valves 3 and 4 control high pressure steam designated "H.P.Steam", and valve 5 controls the flow of low pressure steam designated "L.P.Steam". Valves 6 to 8 control flow from the outlet conduit 37, and valve 9 controls flow from the inlet conduit 36 to the vacuum pump 33. The latter is a venturi-type pump receiving water through cut-off valve 34 and conduit 35.

To cure a tire, the inlet conduit at 2 may be supplied with heated water at high pressure in the range from about 300 psig to 400 psig, and the inlet conduits at 3 and 4 may be provided with saturated steam at a pressure in the range from about 240 psig to 300 psig. Additional inlet conduits, such as the conduit at valve 5, may be supplied with steam at lower pressure in the range from about 100 psig to about 150 psig.

In a particular sequence of curing steps, all the valves 1 through 7 and 9 are initially closed (at the beginning of a cycle). After the green tire is positioned on the lower mold half 15, the valve 8 is closed and the valve 1 is opened to admit shaping steam to the bladder 13 in multiple stages, the first being in the range from about 3 to 5 psig while the tire is being loaded, the subsequent stages being at a pressure in the range from about 5 psig to about 15 psig. The press then closes and locks in the closed position (FIG. 1). The valve 3 is then opened to admit the steam (i.e. at 250 psig, say) to the inlet conduit 36 while outlet 37 is obstructed or cut off. This is the first steam heating stage. If desired valve 4 may be opened instead to provide steam at 300 psig. At the end of stage I, the valves 3 and 4 are closed and valve 2 is opened to admit hot water under pressure in stage II while the outlet 37 is cut off (dead ended). This fills the bladder with water while maintaining the high internal pressure.

At the end of stage II, the valve 3 is opened to admit high pressure steam and valve 7 is opened simultaneously so that the water is expelled from the bladder in a short blowback (not to be confused with "blowdown") period of 1 or 2 min depending on the tire size. Valve 7 is then closed to dead end the steam for the remainder of stage III. One-way check valves (not shown) may be employed in the inlet lines at 1, 2, 3 and 4 to prevent unwanted reverse flow. Before the end of stage III, valves 3 and 4 are closed and optional valve 5 may be opened to admit steam to the bladder at a reduced pressure in the range from 100 psig to about 150 psig. This cools the inner surface of the hot bladder and permits the residual water in the bladder to boil off.

The sequence of press operations is controlled by a sequence control means in the form of a programmable controller ("PC") which includes (i) means for storing and executing a sequence of instructions determinative of a desired shaping pressure within the bladder at which pressure each of plural shaping stages is completed; (ii) means for comparing the first signal with a second signal corresponding to the desired shaping pressure within the range from about 2 psig to about 25 psig; and, (iii) means to maintain the desired pressure for a predetermined period of time when the first and second signals are matched, and thereafter to actuate the initiation of a subsequent shaping stage. After completion of curing, the PC controls curing of the tire with curing fluid at a high enough temperature and pressure to effect the cure in a predetermined period of time.

The PC also includes means for comparing a first signal correlatable to an instantaneous pressure within the bladder, to a subsequent second, third, fourth, et seq signal corresponding to preselected target pressures within the range from about 3 psig to about 15 psig, set for each shaping stage.

Such a PC is commercially available, typified by an Allen Bradley Model 2/30. A program for a particular type and size of tire being cured, allows variable multiple target pressure set points correlatable (i) to the length of time during which the press remains open, and (ii) the number of heats on each bladder. These set points become the new preselected (by the program) target pressures. The instructions determine the pressure events for each operation through the operation of valve events which are controlled by the PC.

The pressure within each bladder 13 and 13' is sensed by connecting the PT through sensing lines 41 and 41' (FIG. 3) in open communication with supply side conduits 26 and 26'. Lines 41 and 41' are typically from about 0.25" to 0.5" in diameter and the sensor and PC are mounted on a panel adjacent the press. If the first target pressure set in the PC of a curing press is 4 psig for the first shaping stage, and the pressure switch for ring drop is set for 2 psig, then the PC will actuate ring drop when 2 psig is sensed by the PT. The PC then actuates progress to the second shaping stage until the second target pressure is sensed, and so forth, sensing each sequentially higher target pressure before it progresses to the next shaping stage.

Operation of the press is commenced when loading (a radial passenger green tire) is initiated to activate press operation. The tire loader carries the green tire into the press and holds it in a centered position over the bladder assembly with the bottom bead just above the bead ring in the lower mold half. Preform shaping steam enters the bladder immediately after loading the press with the green tire. Ring drop occurs after the initial shaping pressure (first shaping pressure) in each bladder has reached approximately 2 psi and is activated by a pressure switch set at 2 psi. Pressure continues to build up until the first target pressure (4 psig) for routine operation, is reached.

By "routine operation" I refer to operation of the press with less than about 5 minutes of down time, and using a bladder which has more than about 10 or 12 heats on it (for a typical passenger car tire). After a relatively longer down time the press is cooler and the first target pressure will be higher, the precise pressure being determined by the program in the PC. Similarly, the target pressure for each successive shaping stage is independently increased as a function of press down time.

When a new bladder is fitted, the first target pressure will be higher during the initial heats, say 6 psig, depending upon the particular characteristics of the bladder. The target pressures for successive shaping stages may also be higher than those set for routine operation. During the terminal heats on the bladder, when it is relatively easily distended, the target pressure for one or more stages will decrease. Thus the PC automatically increses the target pressure during the initial heats on the bladder, and decreases target pressure during the terminal heats on the bladder, the modification, namely increase or decrease from routine target pressures being computed and preselected so that each target pressure is sufficient to prevent a shaping defect.

A second shaping pressure which is higher than the first, is activated as the press starts to close. A third shaping pressure which is higher than the second is activated about 10–14 ins before the press closes. The precise level of shaping pressures for the second and third steps will depend upon the tire and bladder combination, but the third stage pressure for a radial tire is always less than about 20 psig. Typically the second shaping pressure is 7–10 psig and the third is 10–15 psig. The preform shaping steam pressure is on sweep shape through valve 6 and the flow of steam continues until approximately 4 ins from press close, at which time valve 6 is closed (blocked off).

The interval of time during which shaping fluid is held in the bladder to shape the tire, is programmed into, and thus fixed in the PC. Routinely, the shaping is effected in three stages.

The pressure in the bladder is sensed by the PT distally located relative to the mold halves but in pressure sensing communication with the interior of the bladder so as to generate a first signal correlatable with an instantaneous pressure within the bladder. The particular type of electronic pressure-monitoring device used for the PT is not narrowly critical. The PT used may be any one of the following types: reductive, capacitive, potentiometer, linear variable differential transmitter, force balance, piezoelectric, or resonant wire types. Even strain gauge types may be used, but are not preferred. Most preferred is the capacitive or piezoelectric types which can operate at elevated temperatures in the range from about 100°–250° F.

Blowdown is initiated by closing valve 5 and opening valve 8 to relieve pressure in the bladder and to vent the bladder to the blowdown manifold which is nominally expected to be at atmospheric pressure. Details for using the PC to effect precisely controlled blowdown of a press are given in my copending U.S. patent application Ser. No. 888,896.

The PC may be used in an analogous manner in an Autoform or other press in which shaping of a bladder is critical. The PC in combination with the PT may also be used on a curing press for a bias tire, except that the target pressures for each stage will be substantially higher than for a radial tire, typically being in the range from about 5–25 psig for the first to the last stage.

From the foregoing description it will now be evident that use of a PT on each curing press, in conjunction with a PC, precisely and factually copes with the myriad multiplicative coincidences which affect the inflation of each bladder to an optimum pressure in the 'real life' operation of a multiplicity of commonly manifolded curing presses in a curing room. Instead of setting a mean period for each shaping stage, which period is arrived at by trial and error over years of operation in a particular curing room, the press is operated reliably and reproducibly when the target pressure for each shaping stage is matched by the pressure in the bladder.

I claim:

1. In a curing room containing plural curing presses for tires, each of which presses is provided with an elastomeric curing bladder to be deployed within a green tire to be cured between separable upper and lower mold halves, and a shaping steam supply conduit through which shaping steam is flowed into said bladder to pressurize it so as to shape the green tire to allow it to be cured without trapping air between the bladder and the tire, the improvement comprising, pressure transducer means distally located relative to said halves but in pressure sensing communication with the interior of said bladder so as to generate a first signal correlatable with an instantaneous pressure within said bladder; programmable controller means including (i) means for storing and executing a sequence of instructions determinative of plural desired shaping pressures within said bladder, at each of which shaping pressures, each of successive shaping stages is completed; (ii) means for presetting a target pressure which is computed as a function of (a) the press down time and (b) the number of heats on the bladder; and, means for generating a second signal corresponding to said preset target pressure; and, (iii) means for comparing said first signal with said second signal corresponding, in turn, to each of said desired shaping pressures within the range from about 2 psig to about 25 psig; and, (iv) means to maintain each said desired pressure for a predetermined period of time when said first and second signals are matched, and thereafter to actuate the initation of a subsquent shaping stage; and, mechanical pressure safety switch means in pressure sensing relationship with the interior of said bladder preset for a preselected pressure at which the press may be safely opened; whereby the pressure in the inflated bladder is variable depending upon the period of time a press remains open before it is loaded, and the number of heats on said bladder.

2. The apparatus of claim 1 wherein said tire is a radial tire, and said first signal corresponds to a first target pressure in the range from 2 psig to about 5 psig at the end of the first shaping stage; thereafter, to a second target pressure in the range from 7 psig to 10 psig; and, thereafter to a third target pressure in the range from 10 psig to 15 psig.

3. The apparatus of claim 2 wherein said pressure transducer includes a pressure sensor chosen from a capacitive type and piezoelectric type.

4. In a process for shaping a green tire with an elastomeric curing bladder into which shaping steam is flowed to pressurize it so at to shape the green tire and allow it to be cured between upper and lower mold halves without trapping air between the bladder and the tire, the improvement comprising, electronically sensing the instantaneous pressure within the bladder at a location distally located relative to said mold halves so as to generate a first signal correlatable with said instantaneous pressure; executing a sequence of instructions to determine a sequence of desired shaping pressures within said bladder each succeeding pressure being different from the preceding one, at each of which shaping pressures, each of successive shaping stages is completed; presetting a target pressures which is computed as a function of (a) the press down time, and (b) the number of heats on the bladder; and generating a second signal corresponding to said preset target pressure and; comparing said first signal with said second signal corresponding, in turn, to each of said desired shaping pressures within the range from about 2 psig to about 25 psig; and, maintaining each said desired pressure for a predetermined period of time when said first and second signals are matched, and thereafter, actuating the initiation of a subsequent shaping stage.

5. The process of claim 4 wherein a pressure target for each shaping stage is independently increased as a function of press down time.

6. The process of claim 4 wherein a pressure target is increased during the initial heats of a bladder and decreased during the terminal heats of the bladder, the increase or decrease of pressure being sufficient to prevent a shaping defect.

* * * * *

UNITED STATES PATENT AND TRADEMARK OFFICE
CERTIFICATE OF CORRECTION

PATENT NO. : 4,744,931

DATED : May 17, 1988

INVENTOR(S) : Dennis L. Trapp

It is certified that error appears in the above-identified patent and that said Letters Patent is hereby corrected as shown below:

Column 10, Line 39 "at" should read -- as --
Column 10, Line 51 "pressures" should read -- pressure --

Signed and Sealed this

Twenty-seventh Day of February, 1990

*Attest:*

JEFFREY M. SAMUELS

*Attesting Officer*     *Acting Commissioner of Patents and Trademarks*